United States Patent
Erickson

(10) Patent No.: US 10,599,169 B2
(45) Date of Patent: Mar. 24, 2020

(54) SYSTEM AND METHOD FOR OPTIMIZING CARBON DIOXIDE DELIVERY TO CROPS DURING HIGH TEMPERATURE PERIODS

(71) Applicant: Stewart E. Erickson, Hudson, WI (US)

(72) Inventor: Stewart E. Erickson, Hudson, WI (US)

(73) Assignee: The Agricultural Gas Company, Petaluma, CA (US)

( * ) Notice: Subject to any disclaimer, the term of this patent is extended or adjusted under 35 U.S.C. 154(b) by 324 days.

(21) Appl. No.: 15/731,218

(22) Filed: May 4, 2017

(65) Prior Publication Data

US 2017/0318756 A1    Nov. 9, 2017

Related U.S. Application Data

(60) Provisional application No. 62/331,596, filed on May 4, 2016.

(51) Int. Cl.
| | | |
|---|---|---|
| *A01G 9/18* | (2006.01) | |
| *G05D 23/27* | (2006.01) | |
| *A01G 9/24* | (2006.01) | |
| *A01G 7/02* | (2006.01) | |

(52) U.S. Cl.
CPC .............. *G05D 23/27* (2013.01); *A01G 7/02* (2013.01); *A01G 9/246* (2013.01); *Y02A 40/268* (2018.01)

(58) Field of Classification Search
CPC ... A01G 9/18; A01G 7/02; A01G 7/04; A01G 7/06; A01G 17/005; A01G 9/246; G05D 23/27
USPC .................................. 47/17, 58.1 R, 58.1 LS
See application file for complete search history.

(56) References Cited

U.S. PATENT DOCUMENTS

| | | | |
|---|---|---|---|
| 3,673,733 | A | 7/1972 | Allen |
| 5,409,508 | A | 4/1995 | Erickson |
| 5,682,709 | A | 11/1997 | Erickson |
| 6,108,967 | A | 8/2000 | Erickson |
| 6,237,284 | B1 | 5/2001 | Erickson |

(Continued)

OTHER PUBLICATIONS

Goorahoo, Cassel, Carstenson, Ashkan, Crop Growth Enhancement with CO2 Injection into the Crop Canopy with Drip Irrigation, CIT Final Report—Apr. 2003.

(Continued)

*Primary Examiner* — Christopher D Hutchens
(74) *Attorney, Agent, or Firm* — Skinner and Associates; Joel Skinner

(57) ABSTRACT

A system and method of optimizing Carbon Dioxide (CO2) delivery to crops during high-temperature periods. The method of facilitating plant growth includes the steps of (a) determining the wilting temperature of a set of plants; (b) measuring the ambient temperature of the plants; (c) supplying CO2 gas to the plants when the ambient temperature reaches a predetermined temperature point prior to the wilting temperature of the set of plants; and (d) continuing to supply CO2 gas to the plants until the ambient temperature of the set of plants falls below the predetermined temperature point, and then discontinuing supplying CO2 gas to the plants. Temperature of the plants is measured by a temperature sensor continuously monitoring the ambient temperature of the plants. A CO2 gas applicator disposed near the plants supplies CO2. The CO2 gas applicator is connected to a controller that is connected to a CO2 gas source.

20 Claims, 5 Drawing Sheets

(56) References Cited

U.S. PATENT DOCUMENTS

| | | |
|---|---|---|
| 2009/0156875 A1* | 6/2009 | Tomioka ............... B01D 3/101 |
| | | 585/802 |
| 2009/0217577 A1 | 9/2009 | Krabbendam et al. |
| 2010/0042234 A1 | 2/2010 | May et al. |
| 2010/0251428 A1* | 9/2010 | Zeng .................... C07K 14/415 |
| | | 800/298 |
| 2012/0310540 A1* | 12/2012 | McDermitt ........ G01N 21/6486 |
| | | 702/19 |
| 2017/0188531 A1 | 7/2017 | Daniels |
| 2017/0318756 A1 | 11/2017 | Erickson |

OTHER PUBLICATIONS

Hsiao, Molina, Matista, Qiu, Assessing CO2 Enrichment of Air Adjacednt to Crop Canopies in the Field, Final Report, Mar. 28, 2003.

Shrestha, Ashkan, Goorahoo, Carstensen, Crop-Weed Competition as Influenced by Elevated CO2, University of CA.

* cited by examiner

SYSTEM AND METHOD FOR OPTIMIZING CARBON DIOXIDE DELIVERY TO CROPS DURING HIGH TEMPERATURE PERIODS

CROSS-REFERENCE TO RELATED APPLICATIONS, IF ANY

This application claims the benefit under 35 U.S.C. § 119(e) of U.S. Provisional Patent Application Ser. No. 62/331,596, filed May 4, 2016, which is hereby incorporated by reference.

37 C.F.R. § 1.71(e) AUTHORIZATION

A portion of the disclosure of this patent document contains material which is subject to copyright protection. The copyright owner has no objection to the facsimile reproduction by anyone of the patent document or the patent disclosure, as it appears in the US Patent and Trademark Office patent file or records, but otherwise reserves all copyright rights whatsoever.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The present invention relates, generally, to agricultural and horticultural systems, apparatus and methods. Particularly, the invention relates to a system and method of optimizing Carbon Dioxide (CO2) delivery to crops during high-temperature periods.

2. Background Information

Existing technology in this field is believed to have significant limitations and shortcomings. For this and other reasons, a need exists for the present invention.

Wilting occurs when there is a loss of turgor pressure in the leaves' cells. The incipient wilt point is a non-permanent occurrence from which the plant can rather quickly recover, versus the permanent wilt point from which the plant cannot recover and eventually dies. High temperature on higher plants affects the photosynthetic activity rates and is called the heat tolerance limit of plants. This explains in an article "How High Heat Affects Vegetables and Other Crop Plants," 2011; Weekly Crop Update, University of Delaware Cooperative Extension; by Gordon Johnson.

One mechanism in which plants cool themselves is transpiration—that is evaporation of water from the inner leaf to the atmosphere through the leaf openings—stomata. Transpiration rates are an important factor in photosynthesis and transpiration can be interrupted by stomatal closure (self defense mechanism) due to water stress, inadequate water uptake and loss of turgor pressure in the leaves. Photosynthesis rapidly decreases above 94 degrees F. so high temperatures will limit yields in many vegetables. Plants dissipate a large amount of heat if they are functioning normally. However, in extreme temperatures 90s and 100s there is a large increase the water vapor pressure deficient (dryness of the air). Rapid water loss from the plant in the conditions causes leaf stomata to close, again limiting cooling, and spiking leaf temperatures, potentially to critical levels causing damage or tissue death. Leaves can lose water more rapidly than the roots can uptake water; leading to wilting.

All crops respond to exceedingly high temperatures by loss of turgor pressure causing the leaves to go limp and photosynthetic activity to fall to near zero. This phenomena known by agronomist as the incipient wilt point of the plant is plants' survival mechanism, and is commonly referred to as wilting.

All US patents and patent applications, and all other published documents mentioned anywhere in this application are incorporated by reference in their entirety.

BRIEF SUMMARY OF THE INVENTION

The invention provides an system and method which are practical, reliable, and efficient, and which are believed to fulfill the need and to constitute an improvement over the background technology.

In one aspect, the invention provides a method of facilitating plant growth, comprising the steps of (a) determining the wilting temperature of a set of plants having at least one plant; (b) measuring the ambient temperature of the set of plants; (c) supplying CO2 gas to the set of plants when the ambient temperature reaches a predetermined temperature point prior to the wilting temperature of the set of plants; and (d) continuing to supply CO2 gas to the set of plants until the ambient temperature of the set of plants falls below the predetermined temperature point, and then discontinuing supplying CO2 gas to the set of plants.

In another, more specific aspect, the invention provides a method of optimizing plant growth, comprising the steps of:

a. determining the wilting temperature of a set of a plurality of plants with respect to the ambient concentration of CO2 at the set of plants;

b. measuring the ambient temperature of the set of plants;

c. applying CO2 gas to the set of plants when the ambient temperature reaches a predetermined temperature point prior to the incipient wilting temperature of the set of plants, the predetermined temperature point prior to the wilting temperature being in a range between 5 degrees less than the incipient wilting temperature and 15 degrees less than the incipient wilting temperature; and d. continue to apply CO2 gas to the set of plants until the ambient temperature of the set of plants falls below the predetermined temperature point, and then discontinue applying CO2.

The aspects, features, advantages, benefits and objects of the invention will become clear to those skilled in the art by reference to the following description, claims and drawings.

DETAILED DESCRIPTION

The invention provides a system and method of optimizing Carbon Dioxide (CO2) delivery to crops during high-temperature periods.

During a 2002 test plot, applicant noted that an increase in $CO_2$ (or CO2, herein) gas available to tomato plants induced an observable increase in the high-temperature threshold of the incipient wilt point. This was also documented by Bruce Kimball in an orange tree study at Tucson ARS using a flat 300 ppm increase of $CO_2$ to represent rising global atmospheric $CO_2$ concentration.

The present invention provides an optimized process and system, and defines a prescriptive application of the $CO_2$ application to a given specie of crops and resulting crop production, by measuring, defining and programming $CO_2$ application to meet the demands of specific crop species to overcome wilting, while minimizing the use of $CO_2$ once the crops succumb to loss of turgor pressure even in the presence of elevated $CO_2$.

Figure 1:
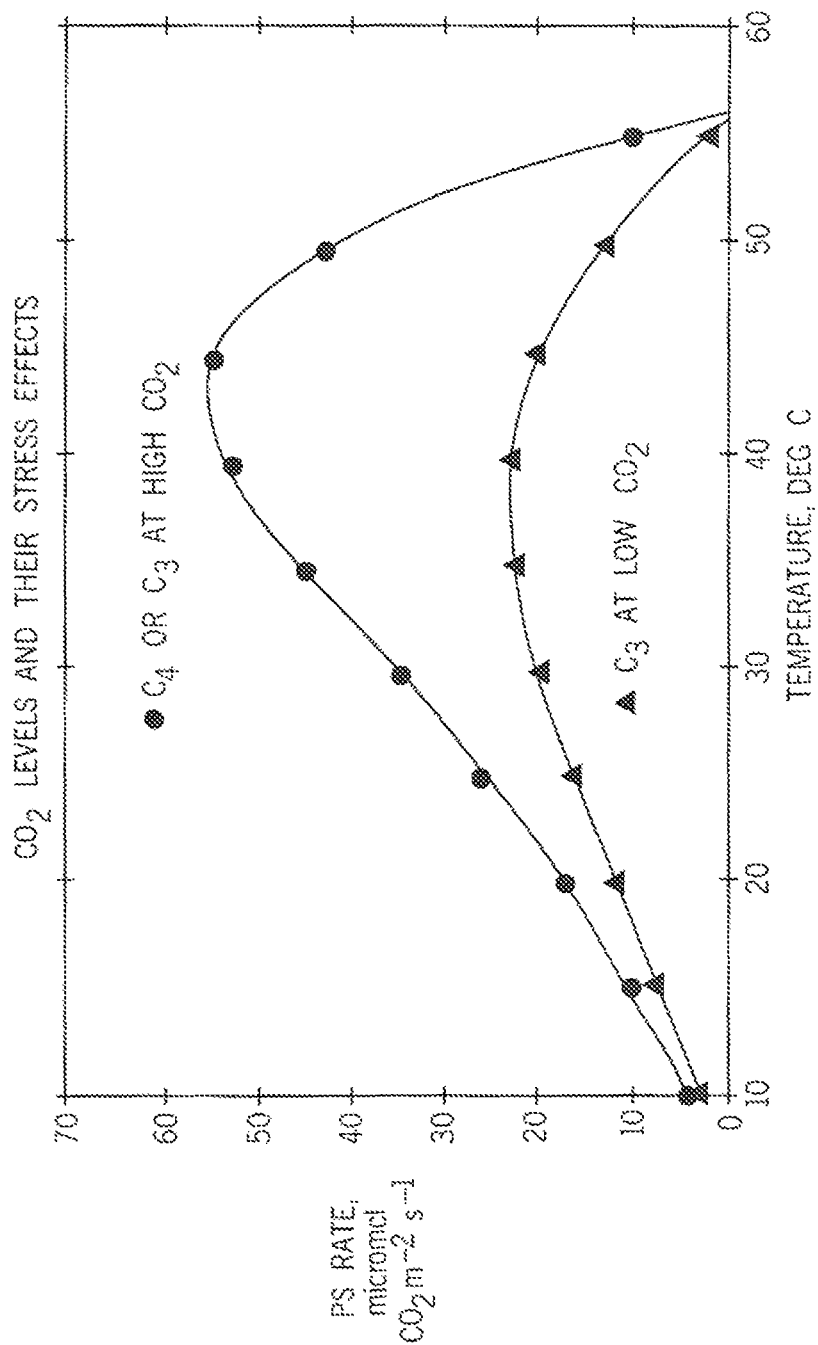
FIG. 1 is a graph showing the relationship between CO2 levels and the stress effects on plants.
Figure 2:
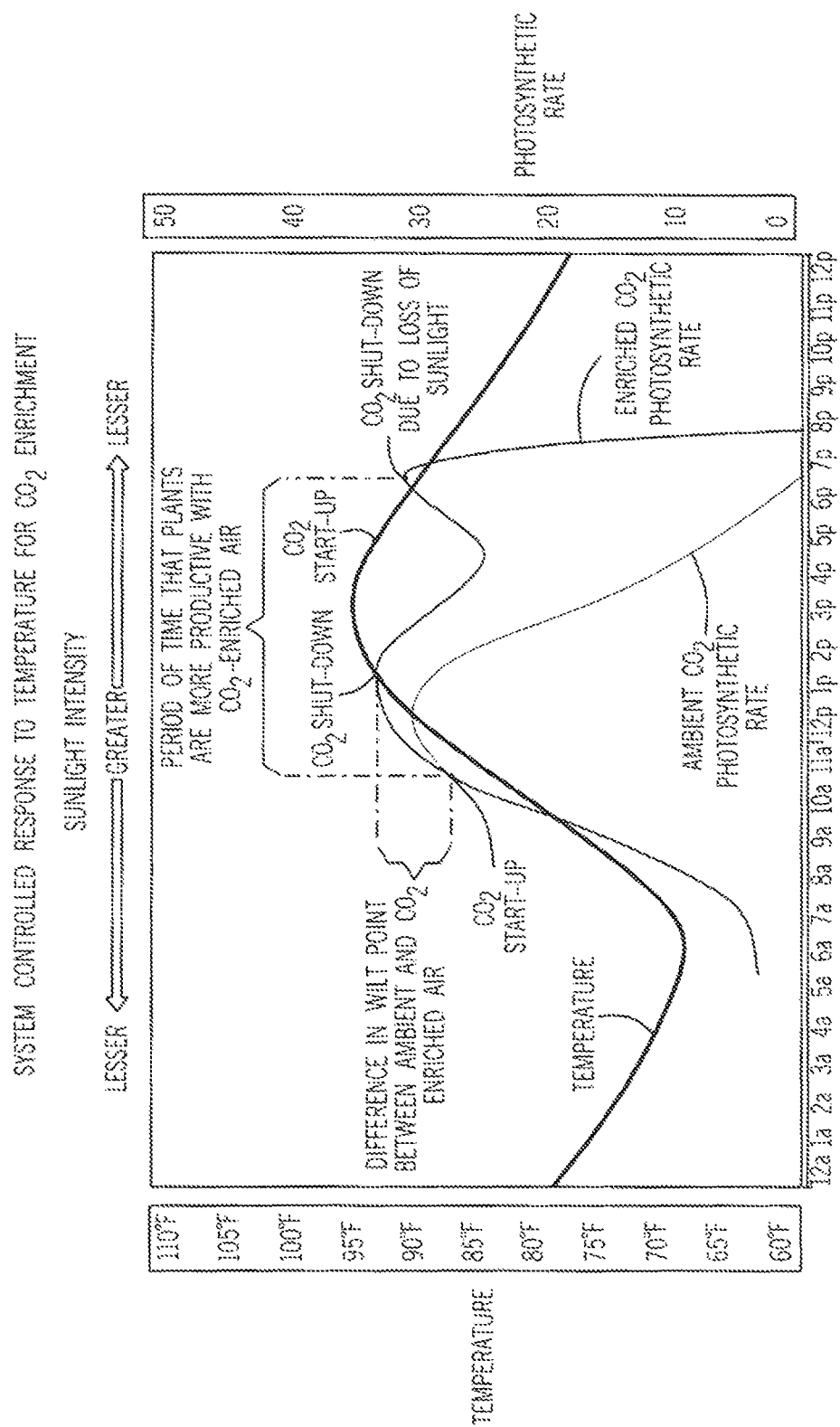
FIG. 2 is a graph of CO2 supply to a set of plants as temperature (and optionally sunlight) change over time, illustrating an embodiment of the method of the invention, whereby CO2 is controlled in response to temperature and light.

Referring to FIG. 2, the following is a process of determining the increased wilt point of the crop response to CO2 enrichment:

A. Observe the wilting temperature on a high temperature day

B. Increase the $CO_2$ concentration along a sliding scale above ambient concentration and determine the crop canopy's CO2 concentration during high sunlight high temperature days and wilt point at that temperature. As outside temperature approaches the crop's wilt point; increase the CO2 enrichment when the normal "Field" wilt point temperature is approaching on a very hot day. Continue CO2 enrichment until the elevated wilt point temperature is exceeded at which point CO2 enrichment is halted. Reinitiate the CO2 enrichment when the temperature falls back to the elevated wilt point temperature. As the temperature falls further reduce the CO2 elevation until at such temperature the crop's photosynthetic rate can proceed unabated in the plant canopy at extant field conditions.

An exemplary sliding scale involves inducing a +400 ambient to 1,500 maximum with 400-1,000 being introduced on the lower temperature inducement and a target of 1,000 to 1,500 being employed during or at the peak point of Photosynthetic Activity Rate during the CO2 induced elevated wilt point gas application and just prior to the "plant set" reaching elevated incipient wilt point induced enriched CO2. Outdoor targets may not be achievable due to wind or other variables at any point in time.

The invention concerns the efficient application of $CO_2$ gas as it impacts the stomatal conductance and elevation of the crops wilt point at high temperature. It is know that every species of plants/crops has an incipient wilt point high temperature or high-temperature where the crop's stomatal conductance is precipitously diminishes reducing the plants' photosynthetic activity rate from a maximum level of activity to extremely low level of activity. While this varies from species to species it generally occurs between 90 and 100 degrees Fahrenheit (32 and 38 degrees Celsius). For instance, in Central Valley Calif., many crops during the summer months really only grow from 6 am to noon, at which point the temperature become too hot and the plants either visibility wilt, or the stomatal conductance is greatly diminished and photosynthetic rate drops from a maximum towards zero.

Tomato trials in Central Valley suggest that tomato plants with CO2 gas added will continue to grow in the high-temperatures. Investigator Bruce Kimball in Arizona, while doing climate change research introducing $CO_2$ 24 hours per day 7 days a week at an elevate rate of 300 ppm on sour orange trees, also noted that the trees exposed to $CO_2$ had continuing activity at temperatures above where the non-co2 trees halted their activity due to high-temperatures.

Applicant has demonstrated very high production gains in Central Valley (120% increase in yields) along the cooler coastal areas in Oxnard Calif. production gains where only about 30%. It is postulated that one of the reasons for this is due to the gains resulting from the elevated wilt point temperate and hours of increased photosynthetic activity from the $CO_2$ gas applications.

The system of the invention includes a software controller setting, in where the crops "normal" wilt point and loss of stomatal conductance and photosynthetic activity is measured and that temperature is determined. Second that the elevated temperature and Photosynthetic Activity Rate (PAR) is measured resulting from the application of $CO_2$ at various increased levels, and the high-temperature point at which the crop succumbs too the heat i.e. loss of stomatal conductance and PAR even with the elevated $CO_2$ is also measured and determined. In order to optimize the applications of $CO_2$ and resulting crop yield increases, the program actuates $CO_2$ delivery prior to the crop "shutting down" due to high temperature, the application of $CO_2$ is continued until the $CO_2$ induced higher wilt point loss of PAR is exceeding in the field at which point the application of $CO_2$ is halted. When the extant temperature falls to the induced level again, provided there is adequate sunshine available for photosynthetic activity the $CO_2$ application is reinitiated. And if the temperature falls further below the crops ambient ability to function at a high level of PAR the $CO_2$ can be reduced further or shut off all together.

The system allows the $CO_2$ to "operate at the margin" allowing the least amount of $CO_2$ to be used with the maximum benefit to the crops.

The Consequences of $CO_2$ deprivation in the crops' range from depressed photosynthetic activity, suppressed high temperature threshold, and magnified stomatal opening permitting more rapid entry of air pollutants to the inner leaf space which impairs defenses, puts the crops at greater risk of disease, and induces further underlying suppression of crop yield.

Figure 3:
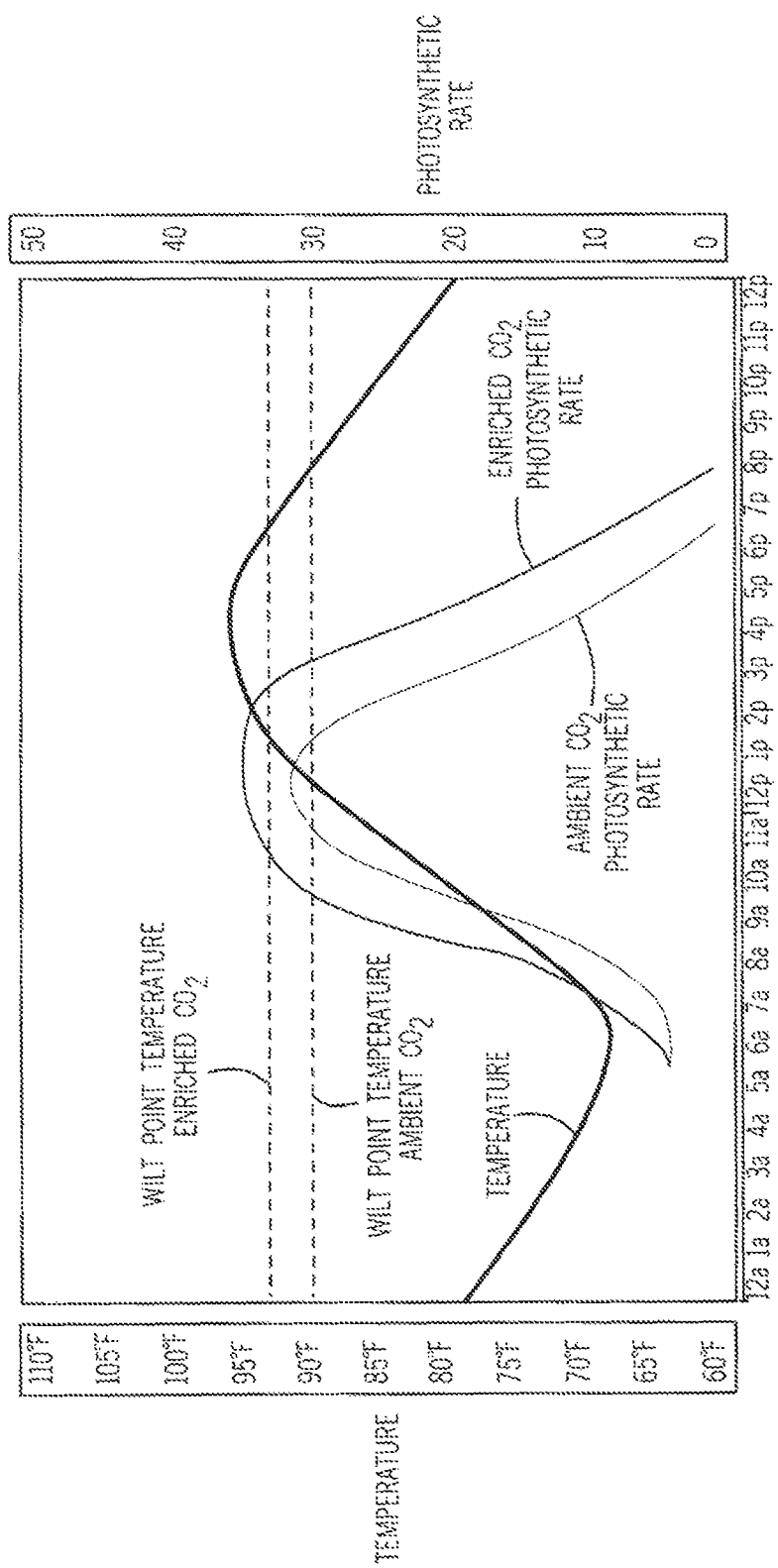
FIG. 3 shows the change in wilt temperature from incipient with normal ambient CO2 to elevated with supply of CO2 using the invention.
Figure 4:
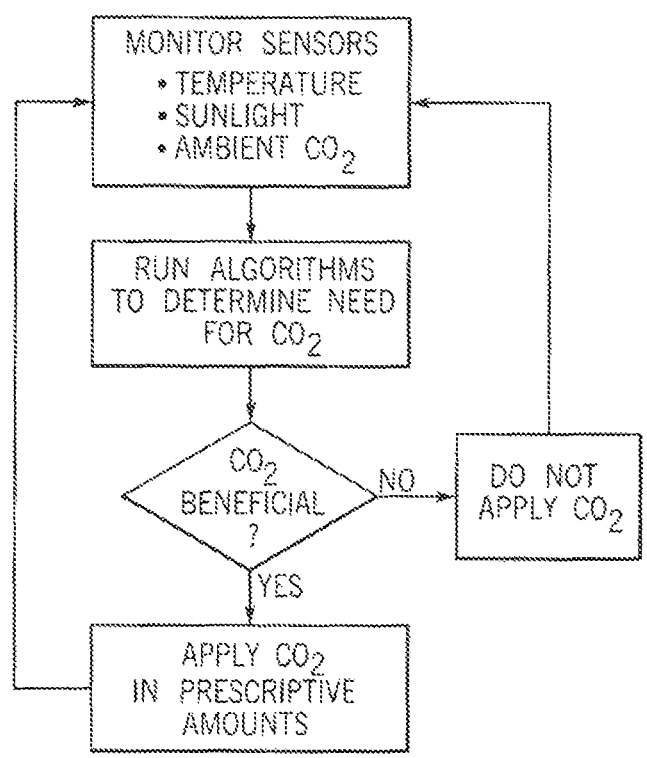
FIG. 4 is a flowchart of an embodiment of the method of the invention.
Figure 5:
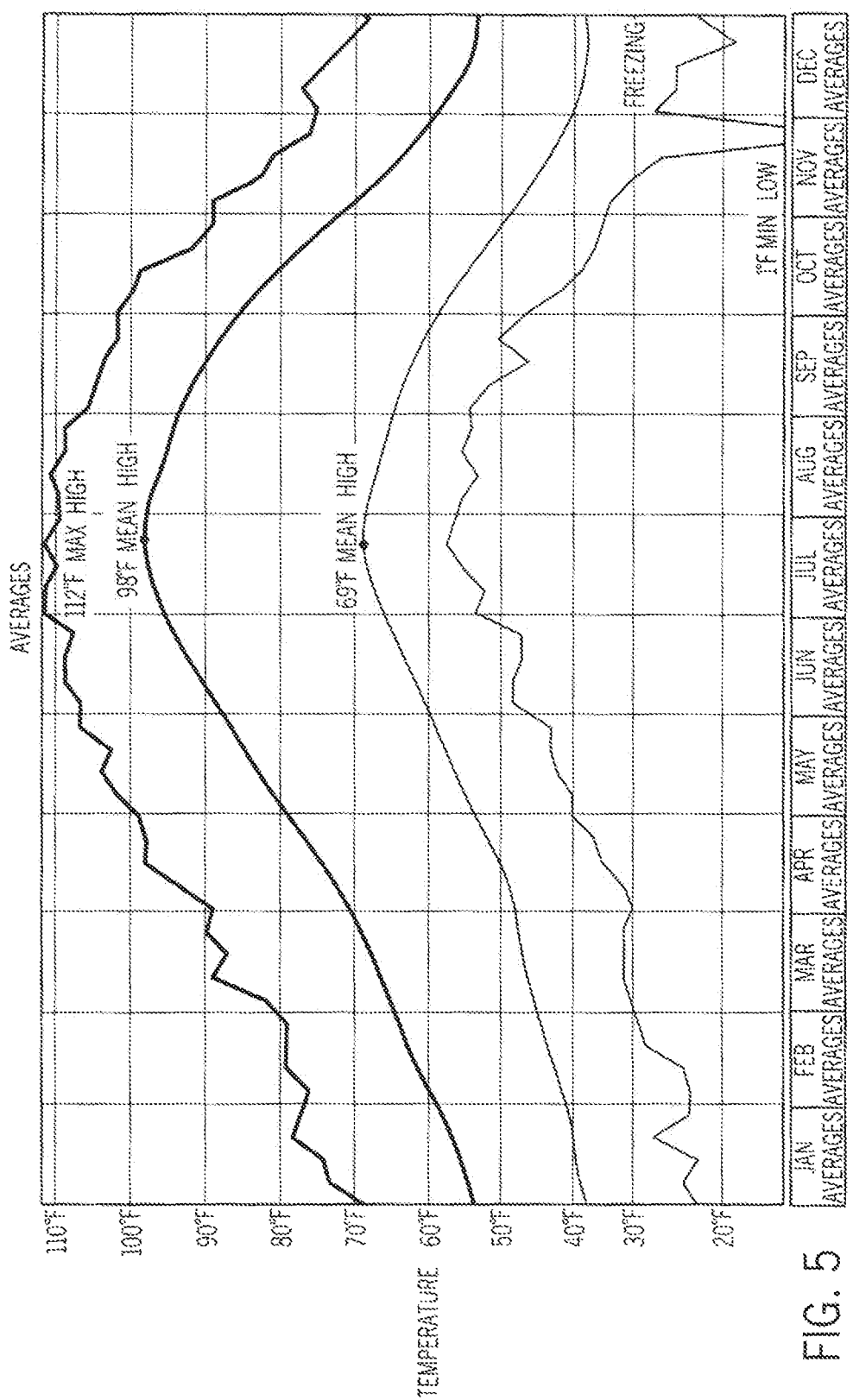
FIG. 5 is a graph showing average annual temperature changes.

Referring to FIGS. 2-4, one embodiment of the method of facilitating plant growth (in an indoor (hoop-house or greenhouse) or outdoor growing environment), includes the steps of:

a. determining the wilting temperature of a plot, field, grove, orchard or the like of plants;
b. measuring the ambient temperature of the plants;
c. supplying CO2 gas to the plants when the ambient temperature reaches a predetermined temperature point prior to the wilting temperature of the plants; and
d. continuing to supply CO2 gas to the plants until the ambient temperature of the plants falls below the predetermined temperature point, and then discontinuing supplying CO2 gas to the plants.

The step of determining the wilting temperature is preferably accomplished by laboratory analysis of the species and variety of plant. The step of determining the wilting temperature is made with respect to the ambient concentration of CO2 at the plants. The wilting temperature is preferably the incipient wilting temperature. However, it is within the purview of the invention that it could be the permanent wilting temperature. The predetermined temperature point prior to the wilting temperature is preferably in a range between 5 degrees less than the wilting temperature and 15 degrees less than the wilting temperature, and most preferably 10 degrees less than the wilting temperature. So, for example, for *Cannabis*, the normal incipient wilting temperature is approximately 80 degrees F. The point of application of CO2 using the method of the invention is 65-75 F. And the most preferred point is 70 F. The process of the invention may automatically shut off at or near sunset (or artificial light shutoff), or at some other predetermined time.

Regarding the system of the invention, the step of measuring the ambient temperature of the plants is preferably accomplished by a temperature sensor continuously monitoring the ambient temperature of the plants. One or more temperature sensors are positioned close to the plant canopy in a neutral position that is not adversely affected by direct sunlight and not cooled by the plant or soil. Temperature may be measured from dawn to dusk. And the step of supplying CO2 gas to the plants is accomplished by at least one CO2 gas applicator disposed near the plants, the CO2 gas applicator being communicatively connected to a controller that is communicatively connected to a CO2 gas source. CO2 gas is supplied at a predetermined rate.

Several additions to the base method and device are possible.

One modification and addition is to adjust CO2 supply by:
a. continuously measuring the ambient concentration of CO2 gas at the plants; and
b. adjusting the rate of supply of CO2 gas to maintain a predetermined ambient concentration of CO2 gas at the plants.

Ambient CO2 is preferably measured between rows of plants.

Another modification is to cycle stopping and starting CO2 supply by: a step (e), after the step (d), of reinitiating supplying CO2 gas to the plants if the ambient temperature of the plants again reaches the predetermined temperature point, and then continuing to supply CO2 gas to the plants until the ambient temperature of the plants falls below the predetermined temperature point, and then discontinuing supplying CO2 gas to the plants.

A further modification is to ration CO2 supply by the steps of:
e. determining an elevated wilting temperature of the plants caused by supplying CO2 gas thereto, and
f. discontinuing to supply CO2 gas to the plants when the ambient temperature either:
  (i) falls below the elevated wilting temperature, thus minimizing CO2 waste because the plants will not wilt at the elevated wilt temperature, or
  (ii) exceeds the elevated wilting temperature, thus minimizing CO2 waste because the temperature is so high that plants cannot be productive, but will survive permanent wilt.

This can be extended by step (h), after the step (g), of reinitiating supplying CO2 gas to the plants if the ambient temperature of the plants again reaches the elevated wilting temperature, and then continuing to supply CO2 gas to the plants until the ambient temperature of the plants falls below the elevated wilting temperature, and then discontinuing supplying CO2 gas to the plants. An exemplary elevated wilt temperature or point may be measured when CO2 is introduced with our system and a trained agronomist visually inspects the plants. More accurately it would be measured by a PAR instrument as the plant bouts through a increasing range of excess ambient temperatures. *Cannabis* has been demonstrated indoors to go from 80 to 88 wilt point with constant CO2 enrichment and constant light.

Yet another modification of the method involves adjustment relative to light intensity. This involves the steps of:
a. measuring the ambient light intensity supplied to the plants; and
b. adjusting the supply of CO2 gas to the plants by increasing or extending supply of CO2 gas as ambient light intensity increases and decreasing or terminating supply of CO2 gas as ambient light intensity decreases.

The ambient sunlight is measured by a light sensor continuously monitoring the ambient light intensity of the set of plants. Light intensity, particularly sunlight intensity affects PAR and leaf temperature, and stomatal conductance. It applies even on hot cloudy days. Sunlight may be measured from dawn to dusk, and in a position capable of receiving full direct light (indoors or outdoors).

Three common use scenarios for CO2 on/off include:
ON Hot—OFF TOO Hot—ON HOT/Cooling—OFF cooling
ON Hot—OFF TOO Hot—ON HOT/Cooling—OFF lack of light
ON Hot—OFF TOO Hot—NEVER COOLS DOWN—OFF until next day due to lack of light Still further, the method may take into account changes in photosynthetic activity rate by the steps of:
a. measuring the photosynthetic rate of the plants by a device or process selected from the group of chemical or electronic devices or processes consisting of gas analysis, CO2 exchange, light analysis, and temperature analysis; and
b. adjusting the supply of CO2 gas to the plants by increasing or extending supply of CO2 gas as the photosynthetic rate increases and decreasing or terminating supply of CO2 gas as the photosynthetic rate decreases.

Photosynthetic activity rate (PAR) is a function of the combination of light, ambient CO2, and temperature. An exemplary device for measuring photosynthetic activity rate is available from LiCor or ADC BioScientific.

The embodiments above are chosen, described and illustrated so that persons skilled in the art will be able to understand the invention and the manner and process of making and using it. The descriptions and the accompanying drawings should be interpreted in the illustrative and not the exhaustive or limited sense. The invention is not intended to be limited to the exact forms disclosed. While the application attempts to disclose all of the embodiments of the invention that are reasonably foreseeable, there may be unforeseeable insubstantial modifications that remain as equivalents. It should be understood by persons skilled in the art that there may be other embodiments than those disclosed which fall within the scope of the invention as defined by the claims. Where a claim, if any, is expressed as a means or step for performing a specified function it is intended that such claim be construed to cover the corresponding structure, material, or acts described in the specification and equivalents thereof, including both structural equivalents and equivalent structures, material-based equivalents and equivalent materials, and act-based equivalents and equivalent acts.

The invention claimed is:

1. A method of facilitating plant growth, comprising the steps of:
   a. determining a wilting temperature of a set of plants having at least one plant;
   b. measuring an ambient temperature of the set of plants;
   c. supplying carbon dioxide (CO2) gas to the set of plants when the ambient temperature reaches a predetermined temperature point prior to the wilting temperature of the set of plants; and
   d. continuing to supply carbon dioxide gas to the set of plants until the ambient temperature of the set of plants falls below the predetermined temperature point, and then discontinuing supplying carbon dioxide gas to the set of plants.

2. The method of claim 1, wherein the step of determining the wilting temperature is accomplished by laboratory analysis of a species and variety of the plant.

3. The method of claim 1, wherein the step of determining the wilting temperature is made with respect to an ambient concentration of carbon dioxide at the set of plants.

4. The method of claim 3, wherein the step of supplying carbon dioxide gas to the set of plants is accomplished by at least one carbon dioxide gas applicator disposed near the set of plants, the carbon dioxide gas applicator being communicatively connected to a controller that is communicatively connected to a carbon dioxide gas source.

5. The method of claim 4, further comprising the steps of:
   a. continuously measuring the ambient concentration of carbon dioxide gas at the set of plants; and
   b. adjusting the rate of supply of carbon dioxide gas to maintain the ambient concentration of carbon dioxide gas at the set of plants.

6. The method of claim 1, wherein the wilting temperature is the incipient wilting temperature.

7. The method of claim 1, wherein the wilting temperature is a permanent wilting temperature.

8. The method of claim 1, wherein the step of measuring the ambient temperature of the set of plants is accomplished by a temperature sensor continuously monitoring the ambient temperature of the set of plants.

9. The method of claim 1, wherein the predetermined temperature point prior to the wilting temperature is in a range between 5 degrees Fahrenheit less than the wilting temperature and 15 degrees Fahrenheit less than the wilting temperature.

10. The method of claim 9, wherein the predetermined temperature point is 10 degrees Fahrenheit less than the wilting temperature.

11. The method of claim 1, further comprising a step (e), after the step (d), of reinitiating supplying carbon dioxide gas to the set of plants if the ambient temperature of the set of plants again reaches the predetermined temperature point, and then continuing to supply carbon dioxide gas to the set of plants until the ambient temperature of the set of plants falls below the predetermined temperature point, and then discontinuing supplying carbon dioxide gas to the set of plants.

12. The method of claim 1, further comprising the steps of:
   e. determining an elevated wilting temperature of the set of plants caused by supplying carbon dioxide gas thereto, and
   f. discontinuing to supply carbon dioxide gas to the set of plants when the ambient temperature falls either below or exceeds the elevated wilting temperature.

13. The method of claim 1, further comprising the steps of:
   a. measuring an ambient light intensity supplied to the set of plants; and
   b. adjusting the supply of carbon dioxide gas to the set of plants by increasing or extending supply of carbon dioxide gas as the ambient light intensity increases and decreasing or terminating supply of carbon dioxide gas as the ambient light intensity decreases.

14. The method of claim 13, wherein ambient sunlight is measured by a light sensor continuously monitoring the ambient light intensity of the set of plants.

15. The method of claim 1, further comprising the steps of:
   a. measuring a photosynthetic rate of the set of plants by a device or process selected from the group of chemical or electronic devices or processes consisting of gas analysis, carbon dioxide exchange, light analysis, and temperature analysis; and
   b. adjusting the supply of carbon dioxide gas to the set of plants by increasing or extending supply of carbon dioxide gas as the photosynthetic rate increases and decreasing or terminating supply of carbon dioxide gas as the photosynthetic rate decreases.

16. A method of optimizing plant growth, comprising the steps of:
   a. determining a wilting temperature of a set of a plurality of plants with respect to an ambient concentration of carbon dioxide at the set of plants;
   b. measuring an ambient temperature of the set of plants;
   c. applying carbon dioxide gas to the set of plants when the ambient temperature reaches a predetermined temperature point prior to an incipient wilting temperature of the set of plants, the predetermined temperature point prior to the wilting temperature being in a range between 5 degrees Fahrenheit less than the incipient wilting temperature and 15 degrees Fahrenheit less than the incipient wilting temperature; and
   d. continue to apply carbon dioxide gas to the set of plants until the ambient temperature of the set of plants falls below the predetermined temperature point, and then discontinue applying carbon dioxide.

17. A method of optimizing plant growth in lighted conditions, comprising the steps of:
   a. determining a normal, incipient wilting temperature of a set of a plurality of plants with respect to an ambient concentration of carbon dioxide at the set of plants;
   b. determining an elevated wilting temperature of the set of a plurality of plants caused by supplying carbon dioxide gas thereto;
   c. measuring an ambient temperature of the set of a plurality of plants;
   d. applying carbon dioxide gas to the set of a plurality of plants when the ambient temperature reaches a predetermined temperature point prior to the normal, incipient wilting temperature of the set of a plurality of plants, the predetermined temperature point prior to the normal, incipient wilting temperature being in a range between 5 degrees Fahrenheit less than the normal, incipient wilting temperature and 15 degrees Fahrenheit less than the normal, incipient wilting temperature;
   e. discontinuing to supply carbon dioxide gas to the set of a plurality of plants when the ambient temperature exceeds the elevated wilting temperature;

f. reinitiating supplying carbon dioxide gas to the set of a plurality of plants if the ambient temperature of the set of a plurality of plants again falls and reaches the elevated wilting temperature; and g. continue to supply carbon dioxide gas to the set of a plurality of plants until the ambient temperature of the set of a plurality of plants falls below the predetermined temperature point, and then discontinue applying carbon dioxide.

18. A method of optimizing plant growth, comprising the steps of:

a. determining a normal, incipient wilting temperature of a set of a plurality of plants with respect to the ambient concentration of carbon dioxide at the set of a plurality of plants;

b. determining an elevated wilting temperature of the set of a plurality of plants caused by supplying carbon dioxide gas thereto;

c. measuring the ambient temperature of the set of a plurality of plants;

d. applying carbon dioxide gas to the set of a plurality of plants when the ambient temperature reaches a predetermined temperature point prior to the normal, incipient wilting temperature of the set of a plurality of plants, the predetermined temperature point prior to the normal, incipient wilting temperature being in a range between 5 degrees Fahrenheit less than the normal, incipient wilting temperature and 15 degrees Fahrenheit less than the normal, incipient wilting temperature;

e. discontinuing to supply carbon dioxide gas to the set of a plurality of plants when the ambient temperature exceeds the elevated wilting temperature;

f. reinitiating supplying carbon dioxide gas to the set of a plurality of plants if the ambient temperature of the set of a plurality of plants again falls and reaches the elevated wilting temperature, and g. continue to apply carbon dioxide gas to the set of a plurality of plants until there is inadequate light to robustly stimulate photosynthesis.

19. A method of optimizing plant growth, comprising the steps of:

a. determining a normal, incipient wilting temperature of a set of a plurality of plants with respect to the ambient concentration of carbon dioxide at the set of plants;

b. determining an elevated wilting temperature of the set of a plurality of plants caused by supplying carbon dioxide gas thereto;

c. measuring the ambient temperature of the set of a plurality of plants;

d. applying carbon dioxide gas to the set of a plurality of plants when the ambient temperature reaches a predetermined temperature point prior to the normal, incipient wilting temperature of the set of a plurality of plants, the predetermined temperature point prior to the normal, incipient wilting temperature being in a range between 5 degrees Fahrenheit less than the normal, incipient wilting temperature and 15 degrees Fahrenheit less than the normal, incipient wilting temperature;

e. discontinuing to supply carbon dioxide gas to the set of a plurality of plants when the ambient temperature exceeds the elevated wilting temperature; and f. discontinuing to supply carbon dioxide gas to the set of a plurality of plants until the following day, because the ambient temperature exceeds the elevated wilting temperature until sunset.

20. A method of growing plants, comprising the steps of:

a. determining a permanent wilting temperature of a set of plants having at least one plant;

b. measuring an ambient temperature of the set of plants;

c. supplying carbon dioxide gas to the set of plants before the ambient temperature reaches the permanent wilting temperature of the set of plants; and d. continuing to supply carbon dioxide gas to the set of plants until the ambient temperature of the set of plants falls below the permanent wilting temperature, and then discontinuing supplying carbon dioxide to the set of plants.

* * * * *